United States Patent
Aimura et al.

(10) Patent No.: US 7,957,556 B2
(45) Date of Patent: Jun. 7, 2011

(54) VEHICLE SURROUNDINGS MONITORING APPARATUS, VEHICLE, VEHICLE SURROUNDINGS MONITORING METHOD, AND VEHICLE SURROUNDINGS MONITORING PROGRAM

(75) Inventors: Makoto Aimura, Saitama (JP); Hiroshi Hattori, Saitama (JP); Akio Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1058 days.

(21) Appl. No.: 11/787,050

(22) Filed: Apr. 13, 2007

(65) Prior Publication Data

US 2007/0248245 A1 Oct. 25, 2007

(30) Foreign Application Priority Data

Apr. 25, 2006 (JP) .................................. 2006-121168

(51) Int. Cl.
*G06K 9/00* (2006.01)
*G05D 1/00* (2006.01)

(52) U.S. Cl. ......................................... 382/103; 701/28
(58) Field of Classification Search .................. 382/103; 701/28

See application file for complete search history.

(56) References Cited

U.S. PATENT DOCUMENTS

| | | | |
|---|---|---|---|
| 4,490,851 A * | 12/1984 | Gerhart et al. | 382/103 |
| 6,842,531 B2 * | 1/2005 | Ohtsuka et al. | 382/104 |
| 7,130,448 B2 | 10/2006 | Nagaoka et al. | |
| 2003/0138133 A1 * | 7/2003 | Nagaoka et al. | 382/104 |
| 2005/0063565 A1 | 3/2005 | Nagaoka et al. | |
| 2005/0147277 A1 | 7/2005 | Higaki et al. | |

FOREIGN PATENT DOCUMENTS

| | | |
|---|---|---|
| DE | 10301468 | 10/2003 |
| DE | 102004041919 | 4/2005 |
| DE | 102005000646 | 8/2005 |
| JP | 09-180090 | 7/1997 |
| JP | 2002-029346 | 1/2002 |

(Continued)

OTHER PUBLICATIONS

Chuang IEEE publication tilted: "Monocular Multi-Human Detection Using Augmented Histograms of Oriented Gradients" 2008, IEEE.*

(Continued)

*Primary Examiner* — Vu Le
*Assistant Examiner* — Alex Liew
(74) *Attorney, Agent, or Firm* — Carrier Blackman & Associates, P.C.; Joseph P. Carrier; William D. Blackman

(57) ABSTRACT

An object such as a person is extracted from images captured by cameras (2R, 2L) to determine the degree of vertical symmetry of the object (step 33). In the case where the degree of vertical symmetry is determined to be high, the object is determined to be other than a living body (step 33a). In the case where the degree of vertical symmetry is determined to be low, the object is determined likely to be a living body (step 33b). In the case where determined likely to be a living body, the object is further determined to be a predetermined kind of living body (for example, a person) or not based on the image of the object (steps 34 and 35). This allows an extremely reliable and simple determination of whether the type of the object extracted from the image captured by the camera is a living body such as a person.

10 Claims, 9 Drawing Sheets

FOREIGN PATENT DOCUMENTS

| JP | 2003-016429 | 1/2003 |
|----|-------------|--------|
| JP | 2003-284057 | 10/2003 |

OTHER PUBLICATIONS

Hayfron IEEE publication tilted: Human Identification by Spatio-Temporal Symmetry, 2002, IEEE.*

Baumbach, T., Voss K., "Symmetriedetektion-eine robuste, signalbasierte Methode, Mustererkennung 2000, Proc. 22th DAGM-Symposium", published by Springer, Kiel, Sep. 13-15, 2000, pp. 155-162;Friedrich-Schiller-Universitat Jena, Fakultat fur mathematic and Informatik, Lehrstugl fur Digitale Bildverarbeitung, 07740 Jena.

Bertozzi, M., Broggi, A. et al.: "IR Pedestrian Detection for Advanced Driver Assistance Systems—Patern Recognition", published by Springer, Magdeburg, Proc. 25th DAGM Symposium, Sep. 10-12, 2003, pp. 582-590; 4.2, Fig. 4, Universita di Parma—Italy LASMEA UMR 6602 UBP/CNRS, Universite de Clermint-Ferrand—France.

Bertozzi, M., et al.: "Shape-based pedestrian detection and localization" in: "Intelligent Transportation systems, 2003", 2003IEEE, No. 1, pp. 328-333: III. B.

Bertozzi, M., et al.: "Pedestrian Localization and Tracking system with Kalman Filtering" in: Intelligent Vehicles Symposium 2004 IEEE, Parma, Italy, Jun. 14-17, 2004, pp. 584-589; II. B.

* cited by examiner

VEHICLE SURROUNDINGS MONITORING APPARATUS, VEHICLE, VEHICLE SURROUNDINGS MONITORING METHOD, AND VEHICLE SURROUNDINGS MONITORING PROGRAM

BACKGROUND OF THE INVENTION

1. Field of the Invention

The present invention relates to a vehicle surroundings monitoring apparatus which detects an object existing around a vehicle using an image captured by a camera, a vehicle surroundings monitoring method therefor, a vehicle equipped with the vehicle surroundings monitoring apparatus, and a vehicle surroundings monitoring program for use in the vehicle surroundings monitoring apparatus.

2. Description of Related Art

The applicant of the present application suggested an apparatus which monitors the surroundings of a vehicle based on an image captured by a camera mounted on the vehicle as disclosed, for example, in Japanese Patent Laid-Open No. 2003-284057 (hereinafter, referred to as Patent Document 1) or U.S. Pat. No. 7,130,448B2 (hereinafter, referred to as Patent Document 2).

In the technologies disclosed in Patent Documents 1 and 2, two infrared cameras capture images in front of the vehicle and an object is extracted from one of the two captured images. Thereafter, the real space position of the object with respect to the vehicle is detected on the basis of a parallax between the two captured images of the extracted object. Furthermore, determinations are made on a moving direction of the object recognized based on the real space position of the extracted object and time-series data of the object, and an object type (whether a person or an artificial structure). According to the determination results, it is determined whether the object should be considered as a warning target (whether the object is the object which must be avoided from coming into contact with the vehicle). In the case where it is determined to be considered as a warning target, a warning by a sound or an image is issued to a driver. The object type is determined for an object existing approximately in the area in front of the vehicle (the area slightly wider than the vehicle width). In addition, the moving direction of the object is determined for an object existing outside the area.

In the meantime, the object that can be extracted from the image captured by a camera such as an infrared camera includes various types of bodies other than a person such as, for example, an animal, another vehicle, a tree, a utility pole, and a vending machine as well as the person. Among these objects, an object which must be avoided from coming into contact with the vehicle is a person or an animal (a living body) including a person. Therefore, it is required to determine the type of the object extracted from the captured image with a distinction between a living body including a person and any other type (artificial structure).

On the other hand, in Patent Documents 1 and 2, whether the object is likely to be a person (pedestrian) is determined based on various feature values (the luminance distribution, shape, size, and the like) of the image of the object (partial image corresponding to the object) in the captured image. In this instance, an object other than a pedestrian may be determined to be likely to be a pedestrian. Therefore, whether the object is an artificial structure is determined by further determining whether the shape of the partial image of the object matches a predetermined registered pattern of an artificial structure or whether the partial image has a right-angle portion or a linear edge (by further determining whether the partial image of the object has a feature that generally cannot be found in a pedestrian). In the case where the object is determined to be likely to be a pedestrian and not to be an artificial structure as a result of the above determinations, the object is determined to be a pedestrian. The above determination process enables the determination of whether the object is a pedestrian (person) or any other type of object such as an artificial structure with high reliability.

On the other hand, the technologies disclosed in Patent Documents 1 and 2 requires calculations of various feature values or determination processes on the feature values for the object type is determined with the distinction between a pedestrian and any other type. In addition, they require the determination of whether the object is an artificial structure. It is because only the feature values employed in the technologies of Patent Documents 1 and 2 are insufficient to make a distinction between a pedestrian and any other type of object with high reliability. Furthermore, in the case where an object to be avoided is a living body including not only a pedestrian but other types of animals (dogs, cats, and other animals that can move on the ground), it is still necessary to determine whether the object belongs to one of these other types of animals.

Therefore, it has been desired to develop a technique for easily determining the object with a distinction between a living body such as a pedestrian and any other type with high reliability.

Furthermore, in the technologies disclosed in Patent Documents 1 and 2, particularly in the case where a lot of objects are extracted from the captured image, it is necessary to perform arithmetic processing for calculating various feature values and determination processes on the feature values for each of these objects. For this reason, in the technologies disclosed in Patent Documents 1 and 2, a large load is imposed on the arithmetic processing for definitely determining whether the object is a pedestrian and it has been desired to reduce the load.

SUMMARY OF THE INVENTION

The present invention has been provided in view of the above background. Therefore, it is an object of the present invention to provide a vehicle surroundings monitoring apparatus, a vehicle surroundings monitoring method, and a vehicle capable of easily determining the type of the object extracted from an image captured by a camera, particularly whether the object is a living body such as a person or any other type of object with high reliability. It is another object of the present invention to provide a vehicle surroundings monitoring apparatus capable of reducing a load on arithmetic processing for determining the object type. It is still another object of the present invention to provide a vehicle surroundings monitoring program capable of causing a computer to perform processing of the vehicle surroundings monitoring apparatus.

According to one aspect of the present invention to achieve one of the above objects, there is provided a vehicle surroundings monitoring apparatus comprising: an object extraction process unit which extracts an object existing in an imaging area of a camera mounted on a vehicle from an image captured by the camera; an object type determination process unit which determines the type of the extracted object on the basis of the image of the object in the captured image; and a vertical symmetry determination process unit which determines whether the degree of vertical symmetry of the extracted object is high or low on the basis of the image of the object in the captured image, wherein the object type determination process unit includes at least a first-type determination process unit which determines the type of the extracted object on the basis of the determination result of the vertical symmetry determination process unit (First invention).

According to the first invention, the vertical symmetry determination process unit determines whether the degree of vertical symmetry of the extracted object is high or low. In general, a living body such as a person and consequently the image thereof captured by the camera have a low degree of symmetry in the vertical direction and unlikely to have a high degree of symmetry. On the other hand, artificial structures such as a vending machine and a utility pole mostly have a high degree of symmetry in the vertical direction. Therefore, the degree of vertical symmetry of the object in the captured image reflects at least whether the object type is a living body or any other type with high reliability.

Therefore, in the first invention, the object type determination process unit includes at least the first-type determination process unit which determines the type of the extracted object on the basis of the determination result of the vertical symmetry determination process unit. In this instance, the determination result of the vertical symmetry determination process unit, namely the degree of vertical symmetry of the object reflects at least whether the object type is a living body or any other type with high reliability. Therefore, the first-type determination process unit can determine at least whether the object type is a living body or any other type (such as an artificial structure) only based on the determination result of the degree of vertical symmetry of the object.

Therefore, according to the first invention, whether the object type is a living body such as a person or any other type can be easily determined based on the degree of vertical symmetry of the object with high reliability.

In the first invention, particularly there is a very low possibility that a living body is an object determined to have a high degree of vertical symmetry (the object is very likely to be other than a living body), and therefore the first-type determination process unit determines the type of the object to be other than a living body in the case where the degree of vertical symmetry of the object is determined to be high by the vertical symmetry determination process unit (Second invention). More specifically, in the case where the degree of vertical symmetry of the object is determined to be high, the type of the object can be definitely determined to be other than the living body.

Therefore, the object type can be determined to be other than the living body based on the determination result of the degree of vertical symmetry with high reliability immediately.

Furthermore, in the vehicle surroundings monitoring apparatus according to the present invention, preferably the object type determination process unit determines the type of the extracted object with a distinction between a predetermined kind of living body including at least a person and other object types. In this instance, the object whose degree of vertical symmetry is determined to be low by the vertical symmetry determination process unit is likely to be a living body, while it may be an object other than a living body in some cases. On the other hand, the type of the object whose degree of vertical symmetry is determined to be high can be considered to be other than a living body. Therefore, in the case where the type of the object is determined with the distinction between the predetermined kind of living body and other object types, the determination is required only for the objects determined to have a low degree of vertical symmetry. Therefore, in the second invention, the object type determination process unit further includes a second-type determination process unit which determines whether the object is the predetermined kind of living body, on the basis of the image of the object in the captured image, for objects other than those each determined not to be a living body by the first-type determination process unit among the extracted objects (Third invention).

According to the third invention, the second-type determination process unit excludes the objects having a high degree of vertical symmetry from the extracted objects and determines whether the object is the predetermined kind of living body only for the objects whose degree of vertical symmetry is determined to be low. Therefore, the second-type determination process unit does not need to determine whether the object is the predetermined kind of living body for all extracted objects and is only required to determine whether the object is the predetermined kind of living body for the objects likely to be living bodies (having a low degree of vertical symmetry).

As a result, according to the third invention, it is possible to reduce the load on the arithmetic processing for determining whether the object extracted from the image captured by the camera is the predetermined kind of living body including a person.

In the determination by the second-type determination process unit, the object can be determined to be the predetermined type of living body or not based on predetermined feature values of the shape, size, luminance distribution, and the like (except the feature value of the degree of vertical symmetry) of the image of the object (the object whose degree of vertical symmetry is determined to be low) in the captured image, for example.

In the first to third inventions, in the case where the camera is an infrared camera and the captured image is a grayscale image, preferably the object extraction process unit includes a process unit which extracts an area having a luminance value equal to or greater than a predetermined value as a binary object from the captured image and a process unit which extracts an area including the binary object in the grayscale image as the image of a grayscale object on the basis of at least the binary object and the luminance value data of the grayscale image, and the object whose degree of vertical symmetry is determined by the vertical symmetry determination process unit is the grayscale object (Fourth invention).

More specifically, in the grayscale image which is the image captured by the infrared camera, a high-luminance portion corresponds to a portion having a relatively high temperature (head or the like) of the object such as a person. Therefore, the object can be easily extracted as a binary object by extracting a portion having a luminance value equal to or higher than the predetermined value. The binary object may be, however, a part (local portion) of the entire individual object in some cases. Therefore, in the fourth invention, the object extraction process unit extracts the area including the binary object in the grayscale image as the image of the grayscale object. The term "image of the grayscale object" means the minimum or close to minimum image including the entire individual object in the grayscale image. For example, the image that can be extracted as the image of the grayscale object is a rectangular image having a length and a width substantially equal to or slightly larger than the vertical length and the horizontal width of the entire individual object in the grayscale image. Thereafter, the grayscale object is determined regarding the degree of vertical symmetry. This allows an appropriate determination of the degree of vertical symmetry.

The degree of vertical symmetry can be determined based on, for example, the degree of coincidence in luminance distribution between the upper part and the lower part of the grayscale object or the degree of coincidence in shape profile therebetween.

In the inventions (the first to fourth inventions) described above, preferably the vehicle surroundings monitoring apparatus includes an object-to-be-avoided determination process unit which determines whether the object extracted by the object extraction process unit is an object which must be avoided from coming into contact with the vehicle at least on the basis of the determination result of the object type determination process unit and a vehicle equipment control process unit which controls predetermined equipment mounted on the vehicle at least according to the determination result of the object-to-be-avoided determination process unit (Fifth invention).

According thereto, in cases where the object to be avoided satisfies a predetermined requirement (for example, in the case where the object is likely to come in contact with the vehicle) when the object to be avoided includes a living body such as a person, the vehicle equipment can be controlled in such a way as to avoid the contact between the object to be avoided and the vehicle or to facilitate the avoidance. The predetermined vehicle equipment is equipment that can output information (for example, visual information or audible information) for calling the driver's attention to the object to be avoided (a display, a loud speaker, or the like), equipment that can operate the traveling behaviors of the vehicle (for example, a vehicle steering system, a braking system, an actuator of a drive system, or the like), or both thereof.

Furthermore, according to another aspect of the present invention, there is provided a vehicle surroundings monitoring apparatus having a computer, wherein the computer performs: an object extraction process for extracting an object existing in an imaging area of a camera mounted on a vehicle from an image captured by the camera; an object type determination process for determining the type of the extracted object on the basis of the image of the object in the captured image; and a vertical symmetry determination process for determining whether the degree of vertical symmetry of the extracted object is high or low on the basis of the image of the object in the captured image, wherein the object type determination process performed by the computer includes a process for determining the type of the extracted object at least on the basis of the determination result of the vertical symmetry determination process (Sixth invention).

According to the sixth invention, the process of the vertical symmetry determination process unit and the process of the object type determination process unit (including the process of the first-type determination process unit) in the first invention are implemented as the processes performed by the computer. Therefore, according to the sixth invention, whether the object type is a living body such as a person or any other type can be easily determined with high reliability on the basis of the degree of vertical symmetry of the object similarly to the first invention.

In the sixth invention, the same technologies as those of the second to fifth inventions can be adopted.

Furthermore, the vehicle according to the present invention is equipped with the vehicle surroundings monitoring apparatus described in the first to fifth inventions (Seventh invention). Alternatively, the vehicle is equipped with the vehicle surroundings monitoring apparatus described in the sixth invention (Eighth invention).

According to the vehicle of the seventh or eighth invention, it is possible to achieve a vehicle having the same effects as those of the vehicle surroundings monitoring apparatus according to the present invention.

According to still another aspect of the present invention, there is provided a vehicle surroundings monitoring method comprising: a step of extracting an object existing in an imaging area of a camera mounted on a vehicle from an image captured by the camera; a step of determining the type of the extracted object on the basis of the image of the object in the captured image; and a step of determining whether the degree of vertical symmetry of the extracted object is high or low on the basis of the image of the object in the captured image, wherein the step of determining the type of the extracted object includes at least the step of determining the type of the object on the basis of the result of determining whether the degree of vertical symmetry is high or low (Ninth invention).

According to the ninth invention, it is possible to determine at least whether the object type is a living body or any other type (an artificial structure or the like) with high reliability by a simple method only based on the result of determining the vertical symmetry of the object, similarly to the first invention or the sixth invention.

As a result, according to the ninth invention, it is possible to easily determine whether the object type is a living body such as a person or any other type with high reliability on the basis of the degree of vertical symmetry of the object.

According to still another aspect of the present invention, there is provided a vehicle surroundings monitoring program having the functions of causing a computer to perform: a process for extracting an object existing in an imaging area of an imaging device mounted on a vehicle from an image captured by the imaging device; a process for determining the type of the extracted object on the basis of the image of the object in the captured image; a process for determining whether the degree of vertical symmetry of the extracted object is high or low on the basis of the image of the object in the captured image; and a process for determining the type of the object at least on the basis of the determination result of the degree of vertical symmetry (Tenth invention).

According to the program of the tenth invention, it is possible to cause the computer to perform the processes having the same effects described in the first invention.

DETAILED DESCRIPTION OF THE PREFERRED EMBODIMENTS

One embodiment of the present invention will be described with reference to FIG. 1 to FIG. 9.

First, the system configuration of a vehicle surroundings monitoring apparatus of this embodiment will be described with reference to FIG. 1 and FIG. 2. A part of the components of the vehicle surroundings monitoring apparatus are not shown in FIG. 2.

Figure 1:
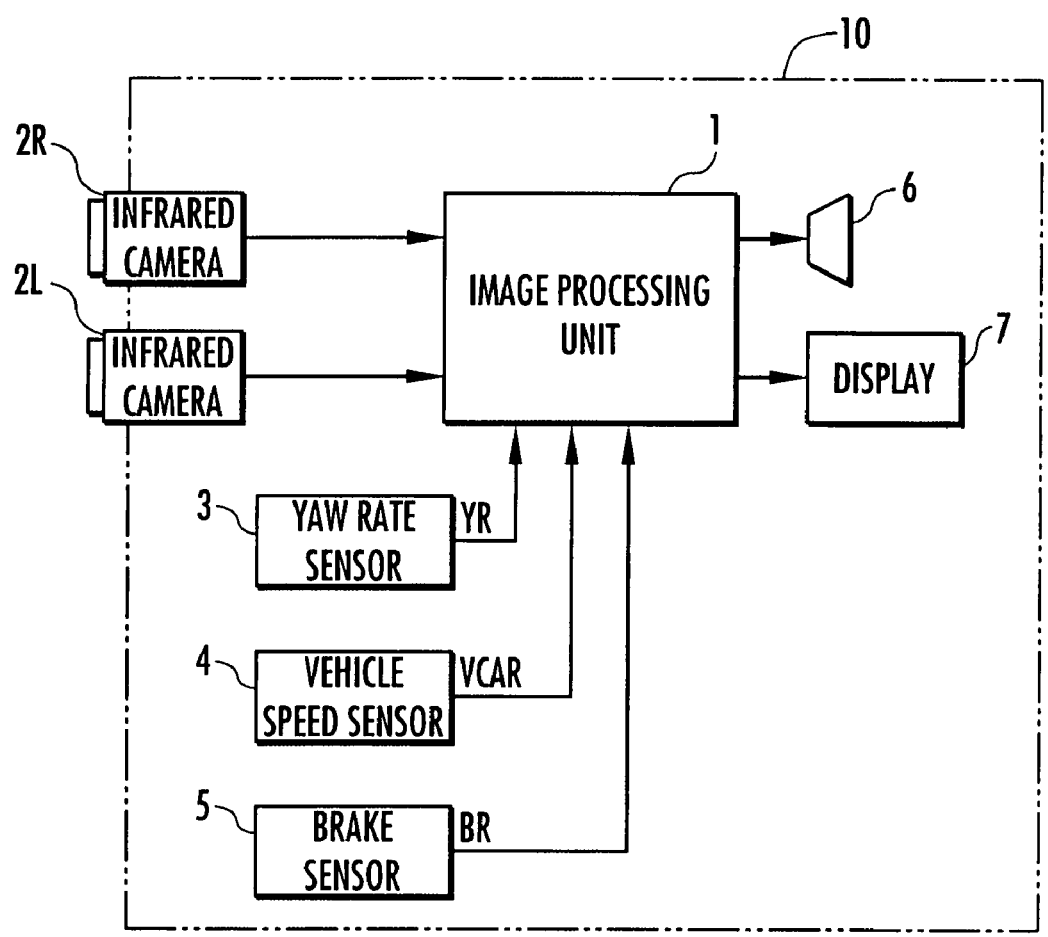
FIG. 1 is a block diagram showing the overall configuration of a vehicle surroundings monitoring apparatus according to one embodiment of the present invention.
Figure 2:
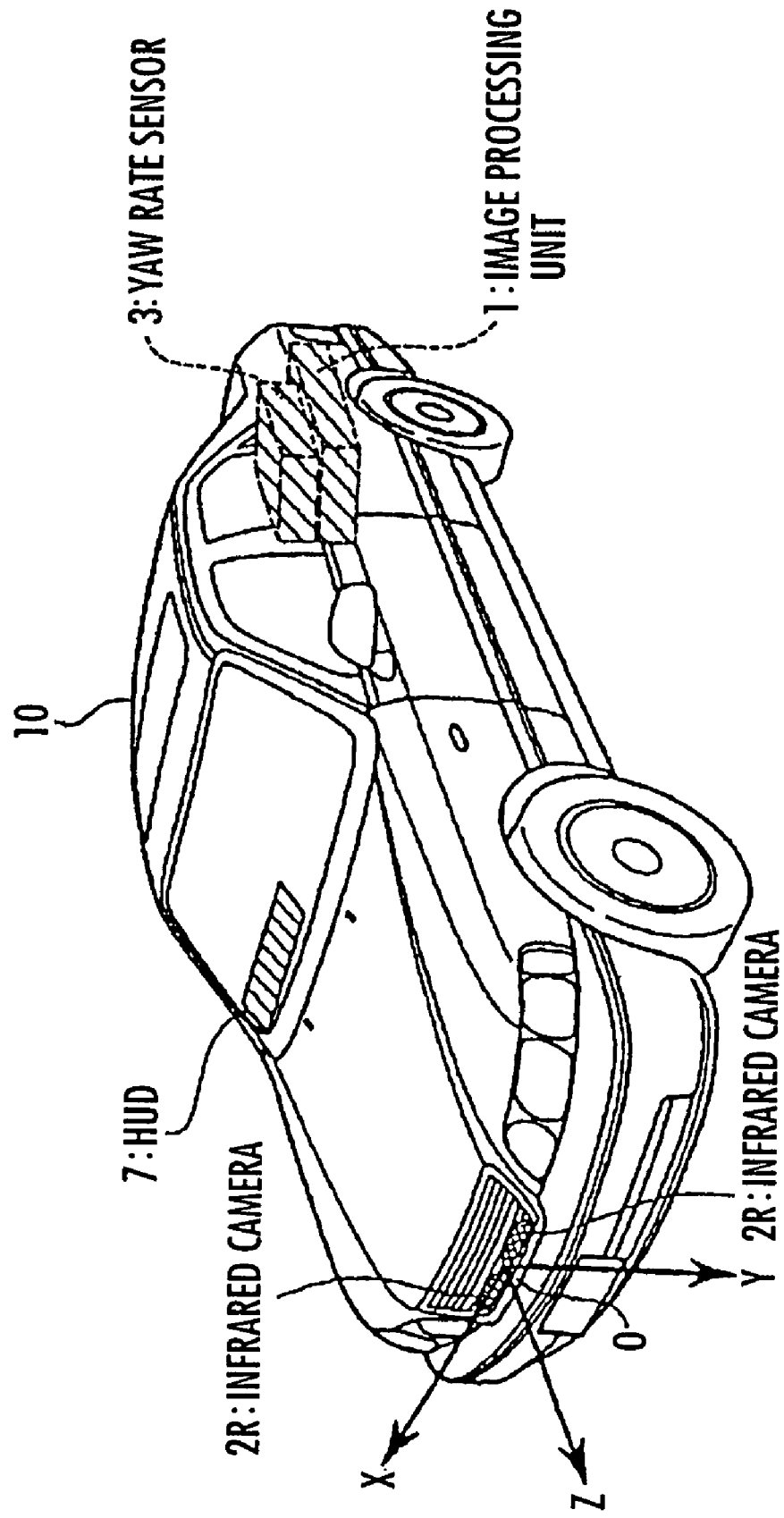
FIG. 2 is a perspective diagram showing the appearance of a vehicle equipped with the vehicle surroundings monitoring apparatus shown in FIG. 1.

Referring to FIG. 1 and FIG. 2, the vehicle surroundings monitoring apparatus according to this embodiment includes an image processing unit 1. The image processing unit 1 is connected to two infrared cameras 2R and 2L as cameras which capture images in front of a vehicle 10. Furthermore, the image processing unit 1 is connected to a yaw rate sensor 3 which detects a yaw rate of the vehicle 10 as a sensor which detects the running condition of the vehicle 10, a vehicle speed sensor 4 which detects a traveling speed (vehicle speed) of the vehicle 10, and a brake sensor 5 which detects a brake operation of the vehicle 10 (more specifically, whether a brake pedal is operated). Still further, the image processing unit 1 is connected to a loudspeaker 6 for use in outputting audible information calling for attention with voice or the like and to a display 7 for use in displaying images captured by the infrared cameras 2R and 2L and visual information calling for attention.

Although detailed illustration is not shown here, the image processing unit 1 is composed of an electronic circuit including an A/D converter, a microcomputer (CPU, RAM, and ROM), and an image memory. Outputs (analog signals) of the infrared cameras 2R and 2L, the yaw rate sensor 3, the vehicle speed sensor 4, and the brake sensor 5 are digitized and input to the image processing unit 1 via the A/D converter. Thereafter, the image processing unit 1 performs the processes of extracting an object such as a person (pedestrian), determining whether the extracted object is the object object which must be avoided from coming into contact with the vehicle, and calling driver's attention to the object determined to be avoided on the basis of the input data by means of the microcomputer. These processes are performed by the microcomputer through executing a program preinstalled in the ROM of the microcomputer. The program includes the vehicle surroundings monitoring program according to the present invention.

The image processing unit 1 includes an object extraction process unit, an object type determination process unit, a vertical symmetry determination process unit, an object-to-be-avoided determination process unit, and a vehicle equipment control process unit in the present invention as functions implemented by the above program.

As shown in FIG. 2, the infrared cameras 2R and 2L are mounted on the front part (the part of a front grille in FIG. 2) of the vehicle 10 to capture images in front of the vehicle 10. In this instance, the infrared cameras 2R and 2L are located on the right side and the left side of the center of the vehicle 10 in the vehicle width direction, respectively. These locations are symmetric with respect to the center of the vehicle 10 in the vehicle width direction. The infrared cameras 2R and 2L are fixed to the front part of the vehicle 10 in such a way that the optical axes of the infrared cameras 2R and 2L are parallel to each other in the anteroposterior direction of the vehicle 10 and that the optical axes are at the same height from the road surface. The infrared cameras 2R and 2L have sensitivities in the far-infrared region. These infrared cameras 2R and 2L each have a characteristic that the higher the temperature of the body captured by the infrared camera is, the higher the level of the output signal of the image of the body is (the luminance of the image of the body is higher).

The display 7 includes a head up display 7a (hereinafter, referred to as the HUD 7a) which displays an image or other information, for example, on the front window of the vehicle 10 in this embodiment. The display 7 can include a display integrally mounted on a meter which displays the running condition such as a vehicle speed of the vehicle 10 or a display provided in an in-vehicle navigation system, instead of the HUD 7a or together with the HUD 7a.

Subsequently, the overall operation of the vehicle surroundings monitoring apparatus of this embodiment will be described with reference to the flowcharts shown in FIG. 3 and FIG. 4. Detailed description of the same processes of the flowcharts shown in FIG. 3 and FIG. 4 as in Patent Document 1 or 2 is omitted in this specification. More specifically, the processes of the flowcharts shown in FIG. 3 and FIG. 4 are implemented by the program executed by the microcomputer of the image processing unit 1.

First, the image processing unit 1 obtains infrared images, which are output signals of the infrared cameras 2R and 2L, in step 1. Then, the image processing unit 1 A/D converts the respective infrared images in step 2. Furthermore, the image processing unit 1 stores the A/D-converted images into the image memory in step 3. Thereby, the images captured by the infrared cameras 2R and 2L are input into the image processing unit 1. Hereinafter, the image obtained from the infrared camera 2R and the image obtained from the infrared camera 2L are referred to as the right image and the left image, respectively. Both of the right image and the left image are grayscale images.

Subsequently, in step 4, the image processing unit 1 considers one of the right image and the left image as a standard image and binarizes the standard image. The standard image is the right image in this embodiment. In this binarization, the luminance value of each pixel of the standard image is compared with a predetermined luminance threshold value. Thereafter, the image processing unit 1 sets a value of "1" (white) for an area having a luminance value equal to or higher than the predetermined luminance threshold value (relatively bright area) and sets a value of "0" (black) for an area having a luminance value lower than the luminance threshold value (relatively dark area) for the standard image. Hereinafter, the image (black and white image) obtained by the binarization will be referred to as the binary image. The area set to "1" in the binary image is referred to as the high-luminance area. The binary image is stored into the image memory separately from the grayscale image (the right image and the left image).

Figure 3:
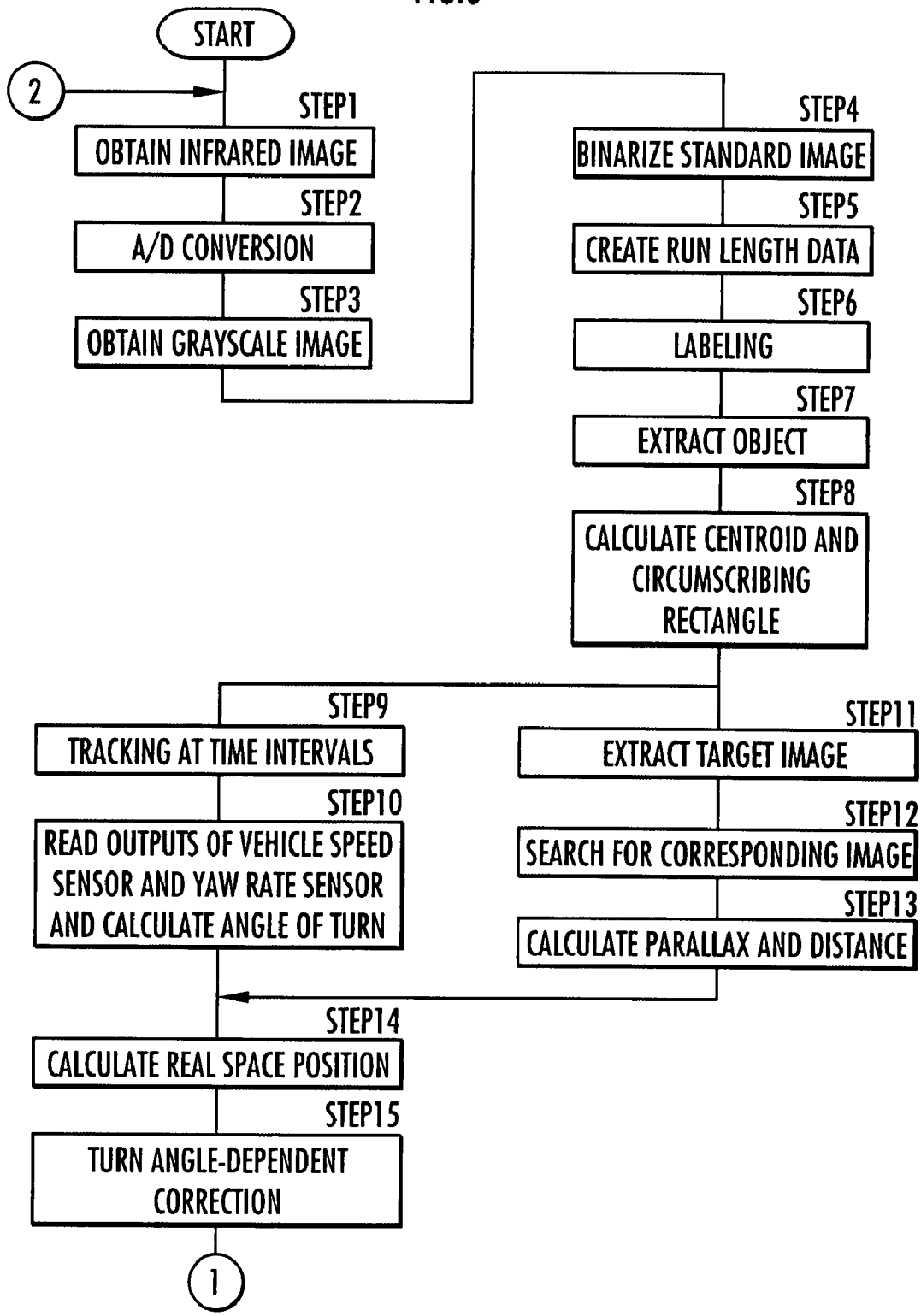
FIG. 3 is a flowchart showing the processes of an image processing unit provided in the vehicle surroundings monitoring apparatus shown in FIG. 1.
Figure 4:
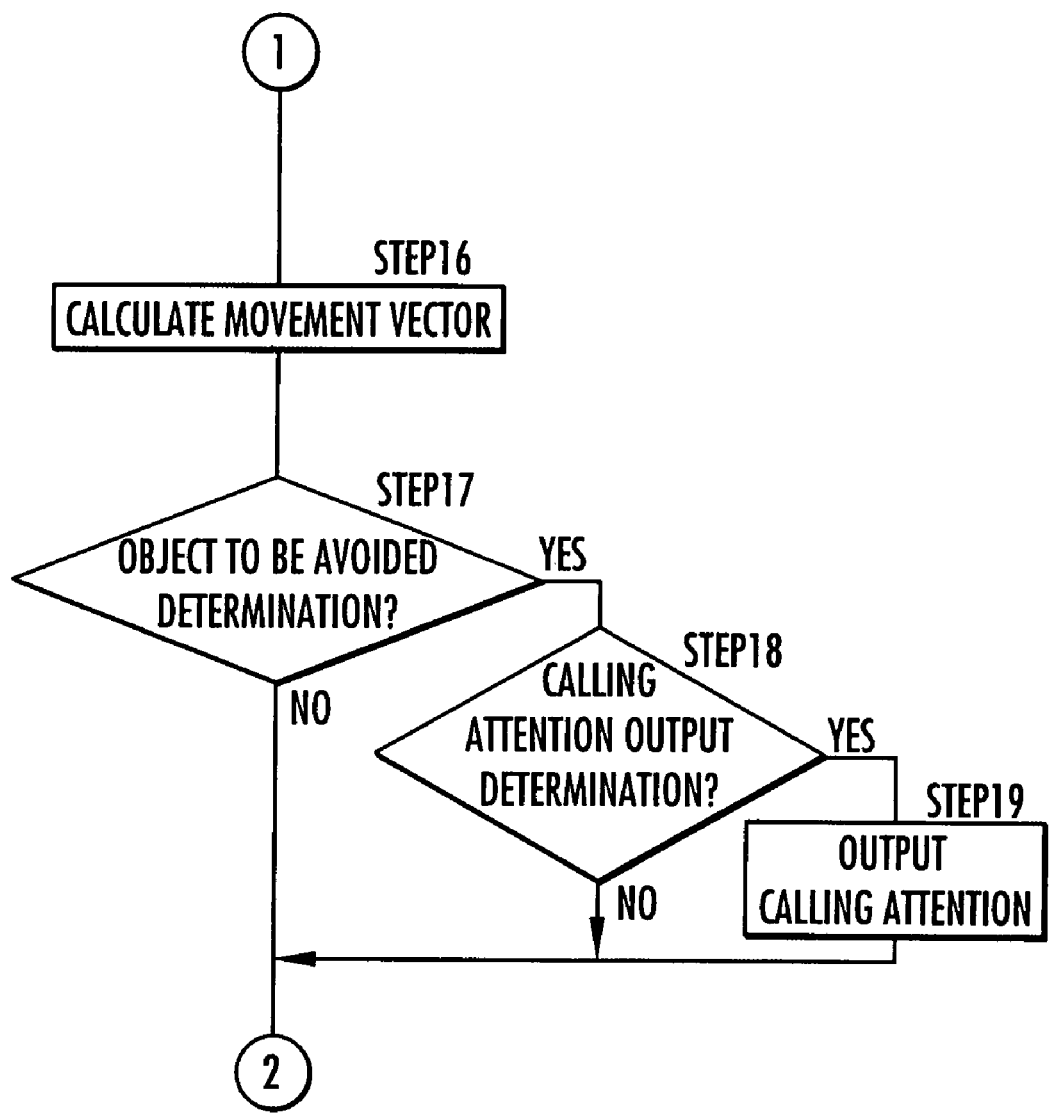
FIG. 4 is a flowchart showing the processes of the image processing unit provided in the vehicle surroundings monitoring apparatus shown in FIG. 1.

More specifically, the processes of steps 1 to 4 are the same as the processes of S1 to S4 in FIG. 3 disclosed in Patent Document 1 or 2.

Subsequently, the image processing unit 1 performs the processes of steps 5 to 7 for the binary image and extracts an object (more accurately, an image portion corresponding to the object) from the binary image. In other words, first in step 5, the image processing unit 1 classifies the pixels constituting the high-luminance area of the binary image into lines each having a width of one pixel in the vertical direction (y direction) of the standard image and extending in the horizontal direction (x direction) thereof and converts each line to run length data including the coordinates of the position (the two-dimensional position in the standard image) and the length (the number of pixels). Thereafter, in step 6, the image processing unit 1 appends a label (identifier) to each of the line groups overlapping in the vertical direction of the standard image in the lines represented by the run length data. Furthermore, in step 7, the image processing unit 1 extracts each of the line groups as an object. The object extracted from the binary image in this manner corresponds to the binary object in the present invention. Hereinafter, the object extracted in step 7 is referred to as the binary object in some cases.

The binary object extracted through the processes of steps 5 to 7 generally includes not only a living body such as a person (pedestrian) but an artificial structure such as another vehicle. In addition, one or more local portions of an identical body may be extracted as a binary object. For example, only a portion around the head of a person may be extracted as a binary object.

Subsequently, in step 8, the image processing unit 1 calculates the centroid position (the position in the standard image) and area of each binary object extracted as described above and the aspect ratio of a rectangle circumscribing the binary object. The centroid position of the binary object is calculated by multiplying the coordinates of the position of each line (the center position of each line) of the run length data included in the binary object by the length of the line, summing up the results of the multiplication of all the lines of the run length data included in the binary object, and dividing the result of the summation by the area of the binary object. Alternatively, the centroid (center) position of the rectangle circumscribing the binary object can be calculated, instead of the centroid position of the binary object.

Next, in step 9, the image processing unit 1 tracks binary objects extracted in step 7 at time intervals, that is, recognizes identical objects for each arithmetic processing period of the image processing unit 1. In this process, assuming that a binary object A is extracted in the process of step 7 at time (discrete time) k in a certain arithmetic processing period and a binary object B is extracted in the process of step 7 at time k+1 in the next arithmetic processing period, the identity between the binary objects A and B is determined. The identity can be determined, for example, based on the shape and size of the binary objects A and B in the binary image and a correlation of the luminance distributions of the binary objects A and B in the standard image (grayscale image). In the case where the binary objects A and B are determined to be identical to each other, the label (the label appended in step 6) of the binary object B extracted at time k+1 is changed to the same label as the binary object A.

The processes of steps 5 to 9 are the same as those of S5 to S9 of FIG. 3 in Patent Document 1 or 2.

Next, in step 10, the image processing unit 1 reads the outputs of the vehicle speed sensor 4 and the yaw rate sensor 3 (the detected value of the vehicle speed and that of the yaw rate). In step 10, the image processing unit 1 also calculates the angle of turn (azimuth) of the vehicle 10 by integrating the detected value of the yaw rate having been read.

On the other hand, the image processing unit 1 performs the processes of steps 111 to 13 in parallel with the processes of steps 9 and 10 or by time-sharing processing. The processes of steps 11 to 13 are performed to calculate a distance of each object (binary object) extracted in step 7 from the vehicle 10 and are the same as those of S11 to S13 of FIG. 3 in Patent Document 1 or 2. Schematically describing the processes, first in step 11, the image processing unit 1 extracts an area corresponding to each object (for example, the area of the rectangle circumscribing each binary object) as a target image R1 in the right image (standard image).

Next, in step 12, the image processing unit 1 sets a search area R2 in the left image, as an area for searching for the same object as one included in the target image R1 of the right image. Furthermore, in step 12, the image processing unit 1 extracts an area having the highest correlation with the target image R1 in the search area R2, as a corresponding image R3 which is the image corresponding to the target image R1 (the image equivalent to the target image R1). In this instance, the image processing unit 1 extracts the area, having a luminance distribution most closely matching the luminance distribution of the target image R1 in the right image, from the search area R2 of the left image as the corresponding image R3. The process of step 12 is performed using the grayscale images, instead of the binary images.

Next, in step 13, the image processing unit 1 calculates the number of pixels of a difference between the horizontal position (the position in the x direction) of the centroid of the target image R1 in the right image and the horizontal position (the position in the x direction) of the centroid of the corresponding image R3 in the left image as a parallax Δd. Furthermore, in step 13, the image processing unit 1 calculates a distance z (the distance in the anteroposterior direction of the vehicle 10) of the binary object from the vehicle 10 by using the parallax Δd. The distance z is calculated by the following equation (1):

$$z=(f \times D)/(\Delta d \times p) \tag{1}$$

where f is the focal distance of the infrared cameras 2R and 2L, D is the base length (the distance between the optical axes) of the infrared cameras 2R and 2L, and p is a pixel pitch (the length of one pixel).

The above is the outline of the processes of steps 11 to 13. The processes of steps 11 to 13 are performed for each binary object extracted in step 7.

After completion of the processes of steps 10 and 13, the image processing unit 1 subsequently calculates the real space position of each binary object, which is the position in the real space of the object (the relative position to the vehicle 10) in step 14. The real space position is the position (X, Y, Z) in the real space coordinate system (XYZ coordinate system) set with the midpoint between the mounting positions of the infrared cameras 2R and 2L as the origin, as shown in FIG. 2. The X direction and Y direction of the real space coordinate system are the vehicle width direction and the vertical direction of the vehicle 10, respectively. The X direction and the Y direction are the same as the x direction (horizontal direction) and the y direction (vertical direction) of the right image and the left image, respectively. The Z direction of the real space coordinate system is the anteroposterior direction of the vehicle 10. The real space position (X, Y, Z) of the object is calculated by the following equations (2), (3), and (4), respectively:

$$X = x \times z \times p/f \tag{2}$$

$$Y = y \times z \times p/f \tag{3}$$

$$Z = z \tag{4}$$

where x and y are the x coordinate and the y coordinate of the object in the standard image. It should be noted that the coordinate system in this condition is an xy coordinate system having an origin around the center of the standard image, though it is not shown here. The origin is a point predetermined so that the x coordinate and the y coordinate are both zero in the standard image of the object when the object exists on the Z axis of the real space coordinate system.

Next, in step 15, the image processing unit 1 compensates for the effect of the change in the angle of turn of the vehicle 10 (the change in the traveling direction of the vehicle 10) and corrects the position X in the X direction of the real space position (X, Y, Z) of the object in order to increase the accuracy of the real space position of the object based on the value calculated by the equation (2) according to the time-series data of the angle of turn calculated in step 10. Thereby, the real space position of the object is finally obtained. In the following description, the term "real space position of the object" means the real space position of the object corrected as described above. The real space position of the object is sequentially calculated for each predetermined arithmetic processing period.

Next, in step 16, the image processing unit 1 determines a movement vector of the object relative to the vehicle 10. Specifically, it determines a straight line approximate to time series data over a predetermined period (the period from the current time to a time the predetermined period of time earlier: hereinafter, referred to as the monitoring period) of the real space position of an identical object and then determines a vector from the position (point) of the object on the straight line at the time the predetermined period of time earlier toward the position (point) of the object on the straight line at the current time as the movement vector of the object. This movement vector is proportional to a relative speed vector of the object with respect to the vehicle 10. The processes of steps 14 to 16 are the same as those of S14 to S16 in FIG. 3 disclosed in Patent Document 1 or 2.

Subsequently, the image processing unit 1 performs an object-to-be-avoided determination process in which it is determined whether each object (binary object) extracted in step 7 is an object which must be avoided from coming into contact with the vehicle 10 (step 17). The object-to-be-avoided determination process will be described in detail later. The object-to-be-avoided determination process in step 17 forms the object-to-be-avoided determination process unit in the present invention.

In the case where the object is determined not to be avoided in the object-to-be-avoided determination process of step 17 (more accurately, in the case where all the objects are determined not to be avoided), NO is given as the result of determination in step 17. In this case, the processing of the current arithmetic processing period terminates and the processing from step 1 is performed again in the next arithmetic processing period. In the case where the object is determined to be avoided in step 17 (in the case where there is an object determined to be avoided), YES is given as the result of determination in step 17. In this case, the control proceeds to step 18, and the image processing unit 1 performs a calling attention output determination process for determining whether to call the attention of the driver of the vehicle 10 to the object determined to be avoided. In this calling attention output determination process, it is checked that the driver is carrying out a brake operation of the vehicle 10 on the basis of an output of the brake sensor 5 and it is determined that the calling attention should not be output in the case where the deceleration (positive in the decelerating direction of the vehicle speed) of the vehicle 10 is larger than a predetermined threshold value (>0). In the case where the driver is not carrying out the brake operation or in the case where the deceleration of the vehicle 10 is equal to or lower than the predetermined threshold value though the driver is carrying out the brake operation, the image processing unit 1 determines that the calling attention should be output.

In the case where the image processing unit 1 determines that the calling attention should be performed (in the case where the determination result is YES in step 18), it performs a calling attention process to call the attention of the driver of the vehicle 10 through the loudspeaker 6 and the display 7 in step 19. After the calling attention process, the processing of the current arithmetic processing period terminates and the processing from step 1 is restarted in the next arithmetic processing period. In the above calling attention process, the standard image is displayed, for example, on the display 7 with the image of the object to be avoided in the standard image highlighted. Furthermore, the image processing unit 1 guides the driver with a voice from the loudspeaker 6 to inform the driver of the existence of the object. This calls the driver's attention to the object. It is also possible to use only one of the loudspeaker 6 and the display 7 to call the driver's attention.

In the case where it is determined that the calling attention should not be performed in step 18 (in the case where it is determined that the calling attention should not be performed for any object to be avoided), the determination result is NO in step 18. In this case, the image processing unit 1 terminates the processing of the current arithmetic processing period and restarts the processing from the step 1 in the next arithmetic processing period.

Additionally, the display 7 and the loudspeaker 6 in this embodiment correspond to the predetermined equipment in the present invention. In the case where one of the steering system, the braking system, and the drive system of the vehicle 10 can be operated using an actuator (consequently, in the case where the traveling behaviors of the vehicle 10 can be controlled), it is also possible to control the actuator of the steering system, the braking system, or the drive system of the vehicle 10 in such a way as to prevent the contact with the object determined to be avoided in step 17 or to facilitate the avoidance. For example, the actuator connected to the accelerator pedal of the drive system is controlled in such a way that a required force on the accelerator pedal by the driver is larger than in the case where there is no object to be avoided (normal condition) so that the vehicle 10 cannot easily accelerate. Alternatively, the actuator connected to the steering wheel is controlled in such a way that a required torque of the steering wheel in the heading direction of the steering system necessary to avoid the contact between the object to be avoided and the vehicle 10 is lower than the required torque of the steering wheel in the opposite direction so as to facilitate the steering wheel operation in the heading direction. Alternatively, the actuator of the braking system is controlled in such a way that the increasing speed of a braking force of the vehicle 10 depending on the depressing amount of a brake pedal of the braking system is higher than the normal condition. This facilitates the driving of the vehicle 10 to avoid contact with the object to be avoided.

In the case where the steering system, the drive system, and the braking system of the vehicle 10 are controlled as described above, the actuators of these systems correspond to the predetermined equipment in the present invention. In addition, it is possible to control one of the steering system, the drive system, and the braking system as described above in parallel with the calling attention through the display 7 or the loudspeaker 6.

The above is the overall operation of the vehicle surroundings monitoring apparatus according to this embodiment.

More specifically, the processes of steps 18 and 19 form the vehicle equipment control process unit in the present invention.

Subsequently, the object-to-be-avoided determination process of step 17, whose description has been deferred until now, will be described in detail with reference to FIG. 5 to FIG. 9.

Figure 5:
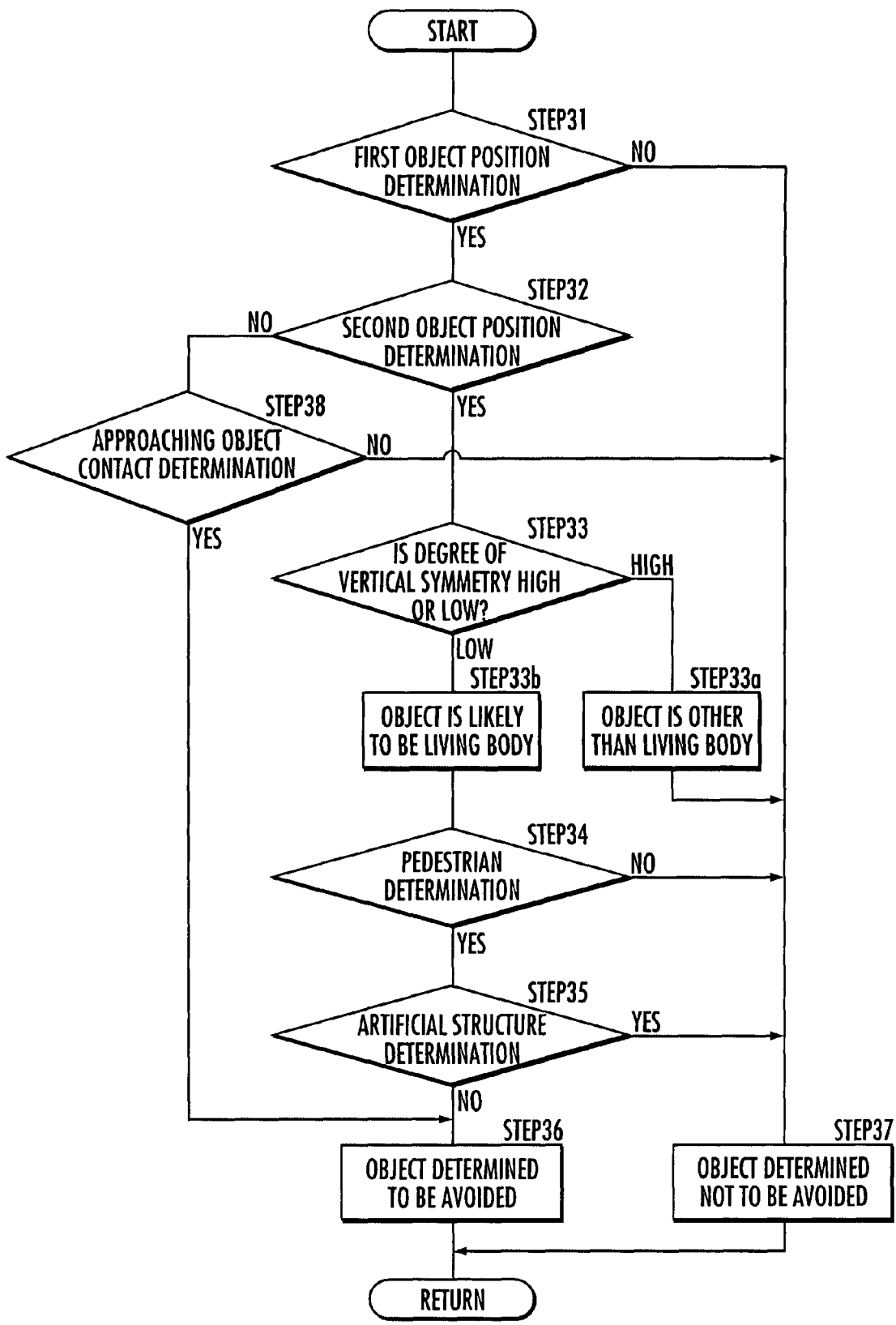
FIG. 5 is a flowchart showing the processes of step 17 in FIG. 4.

Referring to FIG. 5, the object-to-be-avoided determination process in step 17 starts with the execution of a first object position determination process as a first determination process of the real space position of the object, first in step 31. The first object position determination process is performed to determine whether the contact between the vehicle 10 and the object can be avoided well in advance by the steering or brake operation of the vehicle 10. More specifically, in the first object position determination process, it is determined whether the current real space position (the current value of the real space position) of the object exists in the area extending a distance from the vehicle 10 in the Z direction (a distance in the anteroposterior direction of the vehicle 10) equal to or less than a predetermined value (hereinafter, referred to as the first area AR1) of the imaging areas of the infrared cameras 2R and 2L (areas within the viewing angle of the infrared cameras 2R and 2L).

In this determination, the predetermined value of the distance from the vehicle 10 is set for each object (binary object) extracted in step 4. More specifically, the Z-direction component of the movement vector is divided by the monitoring period of time for calculating the movement vector in step 16. This enables the calculation of an average speed Vz of the object (the average value Vz of a relative speed of the object in the anteroposterior direction of the vehicle 10) in the monitoring period. Thereafter, a value Vz•T obtained by multiplying the average speed Vz by a predetermined constant T (a constant in the time dimension) is set as the predetermined value which defines the boundary in the Z direction of the first area AR1.

Figure 7:
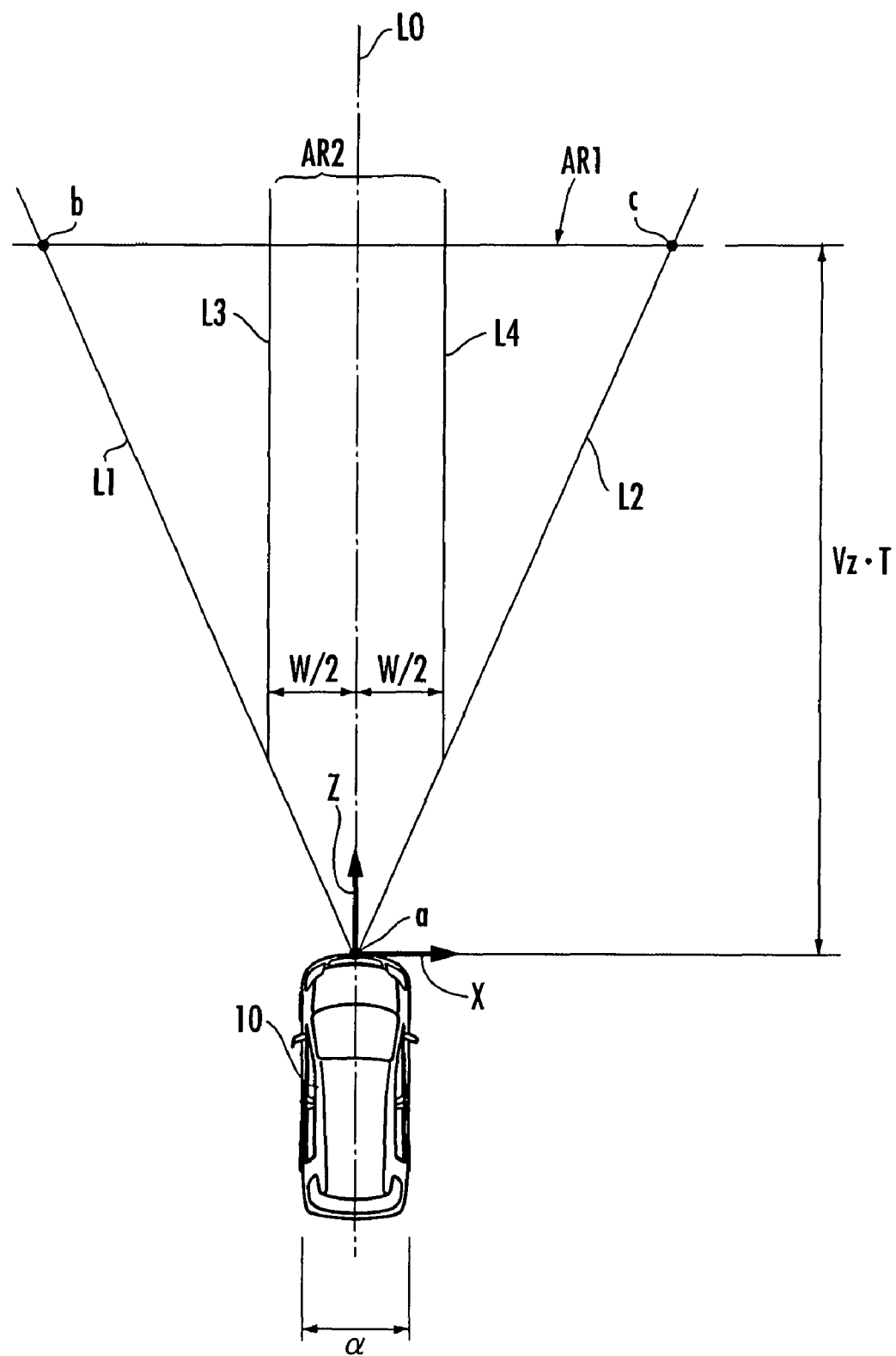
FIG. 7 is a diagram for explaining an area for use in the processes of steps 31 and 32 shown in FIG. 5.

The first area AR1 set in this manner corresponds to an area formed by a triangle abc shown in FIG. 7 on a plane view of the vehicle 10 viewed from the above. A straight line L1 including a line segment ab and a straight line L2 including a line segment ac are left and right boundaries of the viewing angle (the viewing angle in the horizontal direction) of the infrared cameras 2R and 2L. The first area AR1 has a predetermined height (for example, a height twice the height of the vehicle 10 or so) in the vertical direction.

The first object position determination process in step 31 is performed to determine whether the object exists in the first area AR1, which is fixed so as to correspond to each object as described above. In the determination process, the object is determined to exist in the first area AR1 in the case where the Z-direction position of the current real space position of the object is equal to or less than Vz•T and the Y-direction position is equal to or less than a predetermined height. In the case where the relative speed Vz of the object existing in the anteroposterior direction of the vehicle 10 is in a direction getting away from the vehicle 10, the object is determined not to exist in the first area AR1.

In the case where the object is determined not to exist in the first area AR1 in step 31 (in the case where the determination result is NO in step 31), it means a situation where the contact between the object and the vehicle 10 can be avoided well in advance by the steering or brake operation of the vehicle 10. In this instance, the image processing unit 1 determines the object not to be avoided in step 37 and terminates the object-to-be-avoided determination process of the object.

On the other hand, in the case where the object is determined to exist in the first area AR1 in step 31 (in the case where the determination result is YES in step 31), the image processing unit 1 further performs a second object position determination process as a second determination process of the real space position of the object in step 32. The second object position determination process is performed to determine whether the vehicle 10 is likely to come in contact with the object assuming that the real space position of the object is maintained at the current position (assuming that the object remains at rest). More specifically, in the second object position determination process, it is determined whether the object exists in an area AR2 (hereinafter, referred to as the second area AR2) between a pair of boundaries L3 and L4 set so as to extend in the anteroposterior direction of the vehicle 10 on both sides thereof (extend in parallel with the center line of the vehicle width L0 of the vehicle 10) as shown in FIG. 7.

In this determination, the left and right boundaries L3 and L4 of the second area AR2 are set to the positions having the same distance W/2 from the center line of the vehicle width L0 of the vehicle 10 on both sides thereof as shown in FIG. 7, where W is a distance between the boundaries L3 and L4. The distance W between the boundaries L3 and L4 is set slightly wider than the vehicle width a of the vehicle 10. Whether the object exists in the second area AR2 is determined depending on whether the value of the X-direction component of the current real space position of the object is between the X-direction position of the boundary L3 and the X-direction position of the boundary L4.

More specifically, the width W of the second area AR2 can be varied according to the driving environment of the vehicle 10 (a vehicle speed of the vehicle 10, a safe distance from the vehicle ahead, and the like).

In the case where the real space position of the object is determined to exist in the second area AR2 in step 32 (in the case where the determination result is YES in step 32), the object is likely to come in contact with the vehicle 10 assuming that the object remains at the current real space position. In this case, the object is determined to be avoided with a requirement that the object is a pedestrian (person) in this embodiment.

Therefore, in the case where the determination result is YES in step 32, the image processing unit 1 first determines whether the degree of vertical symmetry of each object is high or low (either symmetric or not) in the standard image (grayscale image) in step 33 in order to determine the type of the object.

Figure 6:
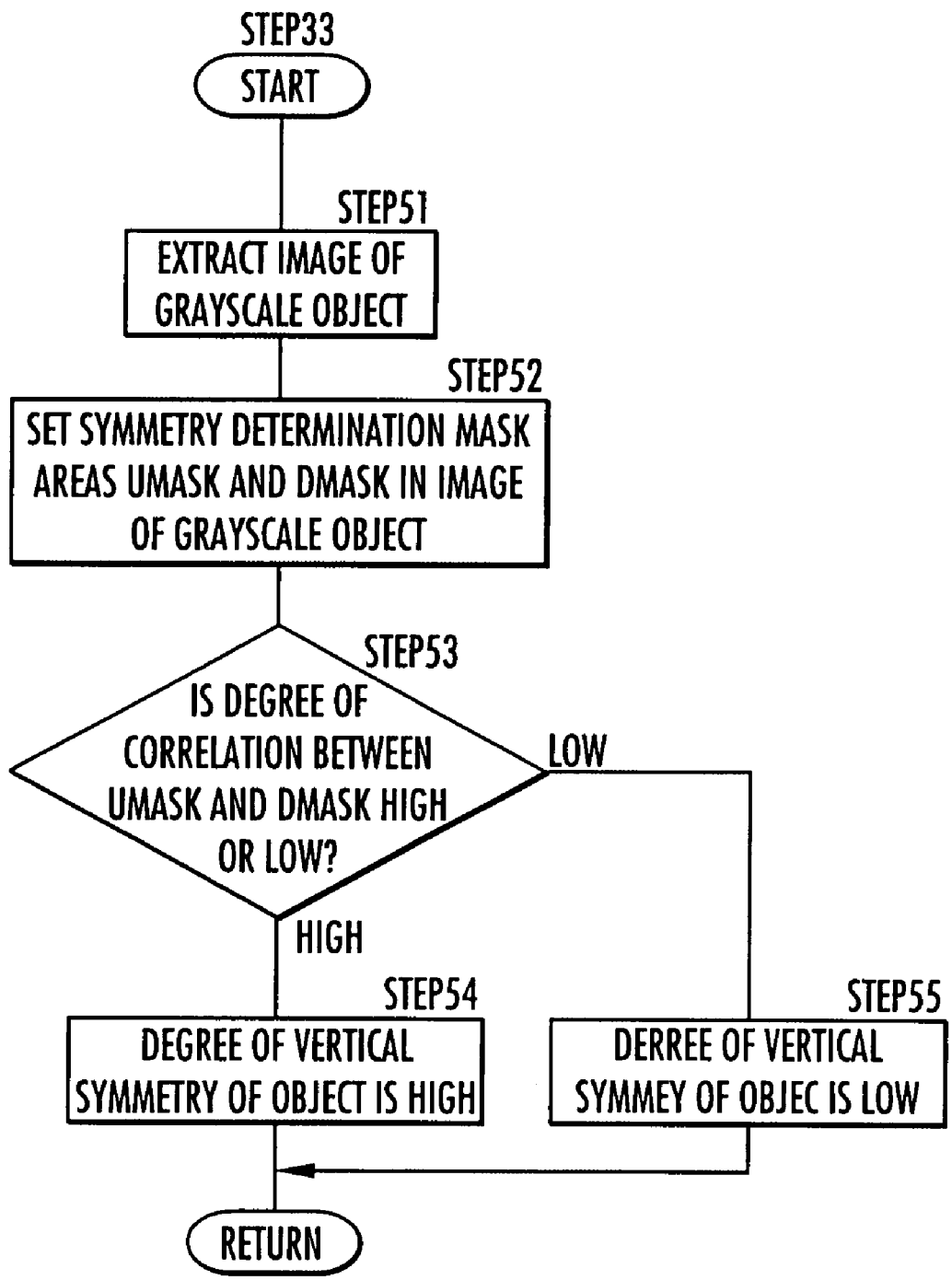
FIG. 6 is a flowchart showing the processes of step 33 shown in FIG. 5.

The determination process is performed as shown in the flowchart in FIG. 6. Referring to FIG. 6, first in step 51, an image of a grayscale object including each binary object is extracted from the standard image.

The term "image of the grayscale object" means an image having the minimum or close to minimum size including the entire individual body (for example, a person) captured as a grayscale image (for example, a rectangular image slightly larger than the entire individual body), and a high-luminance area of the image is extracted as a binary object in step 7.

Figure 8:
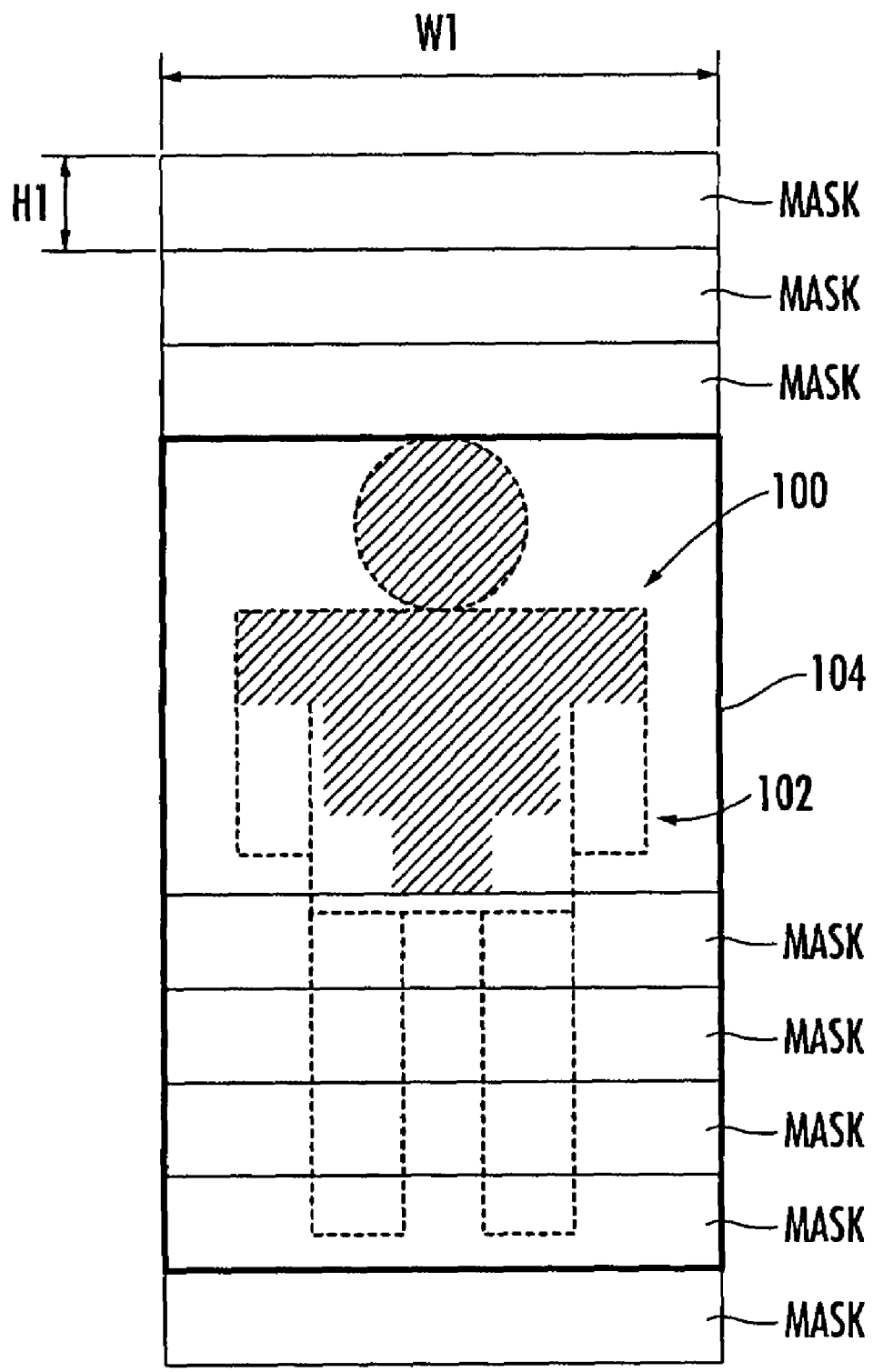
FIG. 8 is a diagram for explaining the process of step 33 shown in FIG. 5.

The process of step 51 will be specifically described below with reference to FIG. 8. FIG. 8 schematically shows an example of the image of a person in the standard image (grayscale image). A shaded portion 100 in FIG. 8 indicates a high-luminance area of the person, in other words, a portion extracted as a binary object in step 7. In this example, only the upper part including the person's head is extracted as the binary object 100. The dashed line shown in FIG. 8 indicates the person's entire outline (edge line) appearing in the standard image (grayscale image). A portion 102 enclosed by the dashed line is the grayscale object. Thereafter, in step 51, a rectangular image (the image enclosed by a thick line frame in FIG. 8) including the grayscale object is extracted.

In more detail, in the process of step 51, first, a plurality of mask areas MASK are arranged in the vertical direction on the upper and lower sides of the binary object 100 in the standard image as shown in FIG. 8. In the illustration, three mask areas MASK are arranged on the upper side of the binary object 100 from the upper end thereof, while five mask areas MASK are arranged on the lower side of the binary object 100 from the lower end thereof.

The respective mask areas MASK are rectangular areas having the same size. The width W1 and the height H1 of the mask area are set according to the distance (the distance in the Z direction) from the vehicle 10 of the binary object 100 calculated in step 13. In other words, the width W1 and the height H1 of each mask area MASK are set in such a way that the values obtained by converting the width W1 and the height H1 of the mask area MASK to real space lengths based on the above equations (2) and (3) are equal to predetermined values (previously determined fixed values). The value obtained by converting the width W1 to the real space length is slightly wider than the shoulder length of an average person. The number of arranged mask areas is determined so that the value obtained by converting the length from the upper end of the uppermost mask area MASK to the lower end of the lowermost mask area MASK to the real space length is longer than the height of an average person to some extent.

Subsequently, the minimum rectangular image area including the entire mask area MASK satisfying the following requirements (A) to (C) is extracted as the image of the grayscale object 102:

The distribution of luminance of the mask area MASK is equal to or greater than a predetermined threshold;

(B) The degree of correlation (the degree of coincidence in the luminance distribution) is high between the mask area MASK in the standard image (right image) and the mask area of the left image corresponding thereto;

(C) The parallax between the mask area MASK in the right image and the mask area in the left image corresponding thereto is substantially the same as the parallax of the binary object 100 (the absolute value of the difference between these parallaxes is equal to or less than a predetermined value).

The requirement (A) means that the mask area MASK includes an image of a person or some other body and its background image. The requirement (B) means that the mask area MASK in the right image and the mask area in the left image corresponding thereto include the same single object. The requirement (C) means that the distance of the body included in the mask area MASK from the vehicle 10 is substantially the same as the distance of the body calculated from the parallax of the binary object 100 from the vehicle 10.

The degree of correlation (the degree of coincidence in the luminance distribution) in the requirement (B) is determined based on a sum of absolute differences (so-called SAD), which is obtained by summing the absolute values of differences in luminance values between all pixels corresponding to each other in the mask area MASK in the right image and the mask area in the left image corresponding thereto, for example. In other words, in the case where the value of the sum of absolute differences is equal to or greater than a predetermined value, the requirement (B) is determined to be satisfied. Regarding the requirement (C), the parallax between the mask area MASK in the right image and the mask area in the left image corresponding thereto is calculated as a parallax of a point of luminance variation in the horizontal direction (x direction) (a point where the luminance variation is equal to or greater than a predetermined value) in each mask area, for example. In the case where the absolute value of a difference between the parallax and the parallax of the binary image is equal to or less than a predetermined value, the requirement (C) is determined to be satisfied.

The image of the grayscale object corresponding to each binary object is extracted by the process of step 51 described hereinabove. In the example shown in FIG. 8, an image area 104 indicated by a thick line in FIG. 8 is extracted as the image of the grayscale object 102. In the example in FIG. 8, each of the mask areas MASK upper than the binary object 100 does not satisfy one of the requirements (A) to (C). Furthermore, the lowest mask area MASK of the mask areas MASK lower than the binary object 100 does not satisfy one of the requirements (A) to (C) and the second-lowest mask area MASK satisfies all of the requirements (A) to (C). Each of the mask areas MASK upper than the second-lowest mask area MASK of the mask areas MASK lower than the binary object 100 satisfies all the requirements (A) to (C) in some cases and does not satisfy them in other cases.

Figure 9:
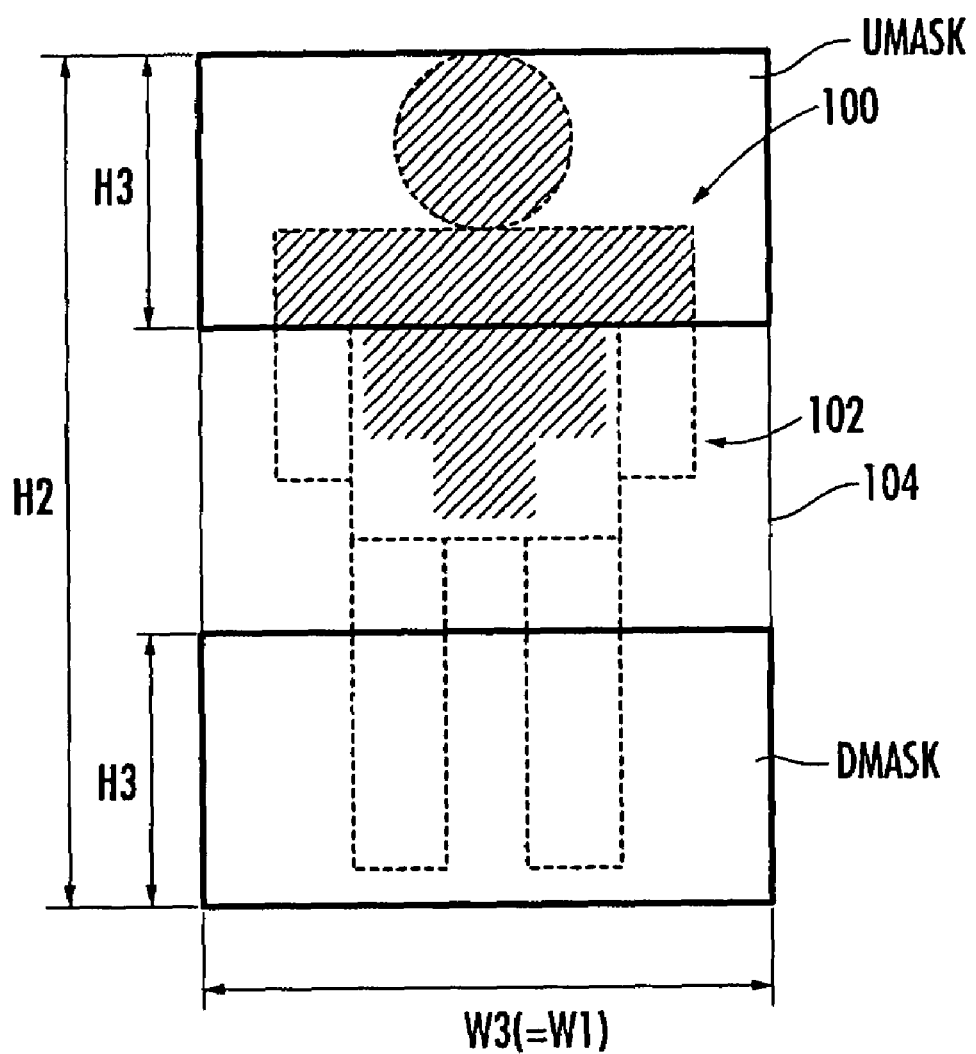
FIG. 9 is a diagram for explaining the process of step 33 shown in FIG. 5.

Returning to FIG. 6, after extracting the images of the grayscale objects corresponding to the binary objects as described above, the image processing unit 1 sets symmetry determination mask areas UMASK and DMASK for determining the degree of vertical symmetry of the grayscale object to the upper part and the lower part of the image in step 52. In this case, as shown in FIG. 9, the symmetry determination mask areas UMASK and DMASK are rectangular areas each having a width W3 which is the same as the width W2 (=the width W1 of the mask area MASK) of the image 104 of the grayscale object 102 and having a vertical length H3 which is a predetermined ratio of the vertical length H2 of the image 104 of the grayscale object 102 (the length obtained by multiplying H2 by a positive constant less than 1). Although the vertical length H3 of the symmetry determination mask area UMASK or DMASK is less than one half of the vertical length H2 (=H2/2) of the image 104 of the grayscale object 102 in this embodiment, it can be the same as H2/2. In other words, the areas obtained by halving the image 104 of the grayscale object 102 into the upper and lower parts can be set as the symmetry determination mask areas UMASK and DMASK. The width W3 of the symmetry determination mask areas UMASK and DMASK can be slightly less than the width W2 of the image 104 of the grayscale object 102.

Subsequently, in step 53, the image processing unit 1 determines the degree of correlation (the degree of coincidence in the luminance distribution) of the symmetry determination mask areas UMASK and DMASK. In the case where determining that the degree of correlation is high, the image processing unit 1 determines that the degree of vertical symmetry of the grayscale object is high in step 54. On the other hand, in the case where determining that the degree of correlation is low, the image processing unit 1 determines that the degree of vertical symmetry of the grayscale object is low in step 55. In this instance, specifically the determination in step 53 is performed by comparing the sum of absolute differences of the symmetry determination mask areas UMASK and DMASK with a predetermined threshold value: in the case where the sum of absolute differences is equal to or less than the predetermined threshold value, the degree of correlation is determined to be high; and in the case where the sum of absolute differences is greater than the predetermined threshold value, the degree of correlation is determined to be low.

The above is the details of the process of step 33. In this instance, in the case where the object is a living body such as a person, the degree of vertical symmetry is low in general. Therefore, the object is determined to be low in the degree of vertical symmetry by the process of step 33. On the other hand, an object other than the living body such as a vending machine or a utility pole has a high degree of vertical symmetry. Therefore, the object is determined to be high in the degree of vertical symmetry.

Returning to the flowchart shown in FIG. 5, in the case where the degree of vertical symmetry of the grayscale object is determined to be high in step 33, the image processing unit 1 determines that the type of the object is other than a living body (an artificial structure such as a utility pole) in step 33a. Furthermore, the object is not a person in this case and therefore the image processing unit 1 determines the object not to be avoided in step 37.

On the other hand, in the case where the degree of vertical symmetry of the grayscale object is determined to be low in step 33, the image processing unit 1 determines that the object is likely to be a living body such as a person in step 33b (step 33b).

More specifically, the fact that the degree of vertical symmetry is determined to be high in step 33 is substantially the same as that the type of the object is determined to be other than a living body. Furthermore, the fact that the degree of vertical symmetry is determined to be low in step 33 is substantially the same as that the type of the object is determined to be likely to be a living body. Therefore, practically the image processing unit 1 does not need to perform the processes of steps 33a and 33b, and therefore the processes of steps 33a and 33b can be omitted. The processes of steps 33a and 33b are provided for convenience of explanation of this embodiment.

Although less frequently, an object other than a living body may be determined to be low in the degree of vertical symmetry in step 33. Furthermore, in the case where an object is an animal other than a pedestrian, its degree of vertical symmetry is determined to be low in step 33.

Therefore, in this embodiment, the image processing unit 1 further performs a pedestrian determination process for determining whether the grayscale object is a pedestrian (person) (more accurately, whether the grayscale object is likely to be a pedestrian) in step 34 for the object determined to be low in the degree of vertical symmetry in step 33. The pedestrian determination process is performed only for an object determined to be low in the degree of vertical symmetry. Therefore, the pedestrian determination process is performed for objects other than objects whose degree of vertical symmetry is determined to be high in step 33 from objects extracted in step 7 (more accurately, objects for which the determination result is YES in step 32).

The concrete process of the pedestrian determination process is the same as the process of S34 in FIG. 5 of Patent Document 1 or 2. Therefore, the detailed description thereof is omitted in this specification. Briefly describing the process, whether the object is a pedestrian is determined based on a plurality of kinds of predetermined feature values (feature values except the degree of vertical symmetry) such as the shape and size of the grayscale object or the binary object, the luminance distribution (luminance variance or luminance average) of the image (the image 104 in FIG. 8) of the grayscale object, and the like. In the determination, it is determined whether the various types of feature values satisfy necessary requirements (requirements such that the feature value is equal to or greater than a predetermined threshold value). Thereafter, whether the object is a pedestrian is determined in consideration of the determination results in a comprehensive manner. Additionally, the process of S34 in FIG. 5 in Patent Document 1 or 2 includes the extraction process of the image of the grayscale object. In this embodiment, however, the image of the grayscale object is extracted in step 33. Therefore, in this embodiment, there is no need to extract the image of the grayscale object in the pedestrian determination process in step 34.

In the case where the object (the object whose degree of vertical symmetry is low) is determined to be unlikely to be a pedestrian in the pedestrian determination process in step 34 (in the case where the determination result is NO in step 34), the image processing unit 1 determines that the object is not to be avoided in step 37.

On the other hand, in the case where the object (the object whose degree of vertical symmetry is low) is determined to be likely to be a pedestrian in step 34 (in the case where the determination result is NO in step 34), the image processing unit 1 performs an artificial structure determination process for determining whether the object is an artificial structure such as another vehicle in step 35 in order to increase the reliability of the determination (in order to definitely determine whether the object is a pedestrian). The artificial structure determination process is the same as the process of S35 in FIG. 5 disclosed in Patent Document 1 or 2. Therefore, the detailed description of this process is omitted in this specification. Briefly describing the process, whether the object is an artificial structure is determined based on the presence or absence of a linear or right-angle portion of the object in the grayscale image, the degree of coincidence between the image of the object and a predetermined registered pattern, and the like.

In the case where the object is determined to be an artificial structure in this determination (in the case where the determination result is YES in step 35), the image processing unit 1 determines that the object is not to be avoided in step 37.

In the case where the object is determined not to be an artificial structure in step 35 (in the case where the determination result is NO in step 35), the object is definitely determined to be a pedestrian. In this case, the image processing unit 1 determines the object to be avoided in step 36.

On the other hand, in the case where the object is determined not to exist in the second area AR2 in step 32 (in the case where the determination result is NO in step 32), the image processing unit 1 subsequently performs an approaching object contact determination process related to the moving direction of the object in step 38. The approaching object contact determination process is performed to determine whether an object is likely to enter the second area AR2 and to come in contact with the vehicle 10. More specifically, assuming that the movement vector of the object calculated in step 16 is maintained as it is (the relative moving direction of the object with respect to the vehicle 10 is maintained as it is), the image processing unit 1 determines the position in the X direction of the intersection point between the straight line including the movement vector and the XY plane of the real space coordinate system in the front end of the vehicle 10. Thereafter, setting a requirement that the determined position in the X direction exists within a predetermined range (a range slightly wider than the vehicle width of the vehicle 10) around the position in the X direction of the center line of the vehicle width L0 of the vehicle 10 (hereinafter, the requirement is referred to as the approaching object contact requirement), the image processing unit 1 determines whether the approaching object contact requirement is satisfied.

In the case where the object satisfies the approaching object contact requirement in step 38 (in the case where the determination result is YES in step 38), the object is likely to come in contact with the vehicle 10 in the future. Therefore, in this case, the image processing unit 1 determines that the object is to be avoided in step 36 and terminates the object-to-be-avoided determination process.

On the other hand, unless the object satisfies the approaching object contact requirement in step 38 (in the case where the determination result is NO in step 38), the object is unlikely to come in contact with the vehicle 10. Therefore, in this case, the image processing unit 1 determines that the object is not to be avoided in step 37 and terminates the object-to-be-avoided determination process.

The above is the detailed object-to-be-avoided determination process in step 17. Additionally, the process of step 33 forms the vertical symmetry determination process unit in the present invention. The process including the process of step 33 and the processes of steps 33a and 33b forms the first-type determination process unit in the present invention. As described above, the processes of steps 33a and 33b can be omitted. Therefore, the process of step 33 can also be considered to be a process having both the function of the vertical symmetry determination process unit and of the first-type determination process unit. Furthermore, the processes of steps 33 to 35 form the object type determination process unit in the present invention. In this instance, the processes of steps 34 and 35 correspond to the second-type determination process unit in the present invention. Still further, the processes of steps 1 to 7 and the process of step 51 form the object extraction process unit in the present invention.

According to this embodiment described above, the degree of vertical symmetry of the object (grayscale object) is determined in step 33 before the execution of the pedestrian determination process in step 34 and the artificial structure determination process in step 35. In the case where the degree of vertical symmetry is determined to be high in the object, the object is determined to be other than a living body including a pedestrian and further determined not to be avoided in step 37. In this case, it is very reliable that an object is other than a living body since the degree of vertical symmetry is high in the object (grayscale object). Moreover, the determination is properly made only based on the degree of vertical symmetry.

Furthermore, the pedestrian determination process in step 34 is performed only for objects whose degree of vertical symmetry is determined to be low after exclusion of objects whose degree of vertical symmetry is determined to be high in step 33. Therefore, particularly when a plurality of binary objects are extracted in step 7 and YES is given as the determination result in step 32 for the binary objects, the number of objects to be determined in the pedestrian determination process can be reduced. In other words, for the objects whose degree of vertical symmetry is determined to be high in step 33, the pedestrian determination process in step 34 and the artificial structure determination process in step 35 can be omitted. This reduces the load on the arithmetic processing necessary for the pedestrian determination process and the artificial structure determination process.

The above embodiment has been described for a case where a person (pedestrian) is the predetermined type of living body in the present invention. The objects to be determined in step 34 can include living bodies such as dogs and cats (particularly, animals moving on the ground). Alternatively, since an object whose degree of vertical symmetry is determined to be low in step 33 is likely to be a living body, the object can be directly determined to be avoided without performing the processes of steps 34 and 35. Alternatively, only the process of step 35 can be performed without performing the process of step 34 for the object whose degree of vertical symmetry is determined to be low.

Furthermore, the degree of vertical symmetry of the grayscale object 102 has been determined based on the degree of correlation (the degree of coincidence in the luminance distribution) between the upper and lower symmetry determination mask areas UMASK and DMASK of the image 104 of the grayscale object 102 in this embodiment. The determination method, however, is not limited thereto. For example, the degree of vertical symmetry of the object 102 can be determined based on the degree of coincidence in the shape profile (the shape of the edge line) of the grayscale object 102 between the symmetry determination mask areas UMASK and DMASK.

Furthermore, while the infrared cameras 2R and 2L have been used in this embodiment, cameras having sensitivity in the visible light region can also be used. Still further, where the relative distance or direction of the object to the subject vehicle, for example, by using radar, the vehicle can be equipped with only a single camera. In this case, images captured by the camera can be used only to determine the type of the object detected by the radar.

What is claimed is:

1. A vehicle surroundings monitoring apparatus comprising:
    an object extraction process unit which extracts an object existing in an imaging area of a camera mounted on a vehicle from an image captured by the camera;
    an object type determination process unit which determines the type of the extracted object on the basis of the image of the object in the captured image; and
    a vertical symmetry determination process unit which determines whether a degree of vertical symmetry of the extracted object is high or low on the basis of the image of the object in the captured image,
    wherein the object type determination process unit is constructed to determine the type of the extracted object with a distinction between a predetermined kind of living body including at least a person and other object types, and includes
        a first-type determination process unit constructed to determine the type of the object to be other than a living body in the case where the degree of vertical symmetry of the object is determined to be high by the vertical symmetry determination process unit, and further includes
        a second-type determination process unit constructed to determine whether the object is the predetermined kind of living body, on the basis of the image of the object in the captured image, for objects other than those each determined not to be a living body by the first-type determination process unit among the extracted objects, when the degree of vertical symmetry of the object is determined to be low by the vertical symmetry determination process unit.

2. The vehicle surroundings monitoring apparatus according to claim 1, wherein:
    the camera is an infrared camera and the captured image is a grayscale image;
    the object extraction process unit includes a process unit which extracts an area having a luminance value equal to or greater than a predetermined value as a binary object from the captured image, and a process unit which extracts an area including the binary object in the grayscale image as the image of a grayscale object on the basis of at least the binary object and the luminance value data of the grayscale image; and
    the object whose degree of vertical symmetry is determined by the vertical symmetry determination process unit is the grayscale object.

3. The vehicle surroundings monitoring apparatus according to claim 1, further comprising:
    an object-to-be-avoided determination process unit which determines whether the object extracted by the object extraction process unit is an object which must be avoided from coming into contact with the vehicle at least on the basis of the determination result of the object type determination process unit; and
    a vehicle equipment control process unit which controls predetermined equipment mounted on the vehicle at least according to the determination result of the object-to-be-avoided determination process unit.

4. A vehicle surroundings monitoring apparatus having a computer, wherein the computer performs:

an object extraction process for extracting an object existing in an imaging area of a camera mounted on a vehicle from an image captured by the camera;

an object type determination process for determining the type of the extracted object with a distinction between a predetermined kind of living body including at least a person and other object types; and a vertical symmetry determination process for determining whether a degree of vertical symmetry of the extracted object is high or low on the basis of the image of the object in the captured image, wherein the object type determination process performed by the computer includes a first-type determination process for determining the type of the object to be other than a living body in the case where the degree of vertical symmetry of the object is determined to be high by the determination result of the vertical symmetry determination process; and a second-type determination process for determining whether the object is the predetermined kind of living body, on the basis of the image of the object in the captured image, for objects other than those each determined not to be a living body by the first-type determination process among the extracted objects, when the degree of vertical symmetry of the object is determined to be low by the determination result of the vertical symmetry determination process.

5. A vehicle equipped with the vehicle surroundings monitoring apparatus according to claim 1.

6. A vehicle equipped with the vehicle surroundings monitoring apparatus according to claim 4.

7. A vehicle surroundings monitoring method performed by a vehicle surroundings monitoring apparatus arranged in a vehicle, said method comprising:

a step of extracting an object existing in an imaging area of a camera mounted on a vehicle from an image captured by the camera;

a step of determining the type of the extracted object with a distinction between a predetermined kind of living body including at least a person and other object types; and a step of determining whether a degree of vertical symmetry of the extracted object is high or low on the basis of the image of the object in the captured image, wherein the step of determining the type of the extracted object includes a first-type step of determining the type of the object to be other than a living body in the case where the degree of vertical symmetry is determined to be high by the step of determining the degree of vertical symmetry; and a second-type step of determining whether the object is the predetermined kind of living body, on the basis of the image of the object in the captured image, for objects other than those each determined not to be a living body by the first-type step among the extracted objects, when the degree of vertical symmetry of the object is determined to be low by the step of determining the degree of vertical symmetry.

8. A vehicle surroundings monitoring program embodied on a computer-readable medium, and having the functions of causing a computer to perform:

a process for extracting an object existing in an imaging area of an imaging device mounted on a vehicle from an image captured by the imaging device;

a process for determining the type of the extracted object on the basis of the image of the object in the captured image;

a process for determining whether a degree of vertical symmetry of the extracted object is high or low on the basis of the image of the object in the captured image; wherein said process for determining the type of the extracted object determines with a distinction between a predetermined kind of living body including at least a person and other object types;

said process for determining the type of the extracted object comprising a first-type determination process for determining the type of the object to be other than a living body in the case where the degree of vertical symmetry of the object is determined to be high by the determination result of the vertical symmetry determination process; and a second-type determination process for determining whether the object is the predetermined kind of living body, on the basis of the image of the object in the captured image, for objects other than those each determined not to be a living body by the first-type determination process unit among the extracted objects, when the degree of vertical symmetry of the object is determined to be low by the determination result of the vertical symmetry determination process.

9. The vehicle surroundings monitoring apparatus according to claim 1, wherein:

said vertical symmetry determination process unit is operable to set symmetry determination mask areas, one each at upper and lower parts of the image, to determine luminance distribution in each of the mask areas and to compare a difference in luminance distributions of said mask areas with a predetermined threshold value, for determining whether the degree of vertical symmetry of the extracted object is high or low compared to said predetermined threshold value; and a vertical length of each of the symmetry determination mask areas is less than one half of a vertical length of the image; and wherein a width of each of the symmetry determination mask areas is equal to a width of the image.

10. The vehicle surroundings monitoring apparatus according to claim 1, wherein:

said vertical symmetry determination process unit is operable to set symmetry determination mask areas, one each at upper and lower parts of the image, to determine luminance distribution in each of the mask areas and to compare a difference in luminance distributions of said mask areas with a predetermined threshold value, for determining whether the degree of vertical symmetry of the extracted object is high or low compared to said predetermined threshold value; and a vertical length of each of the symmetry determination mask areas by the vertical symmetry determination process unit is one half of a vertical length of the image; and wherein a width of each of the symmetry determination mask areas is equal to a width of the image.

* * * * *